Patented Mar. 9, 1926.

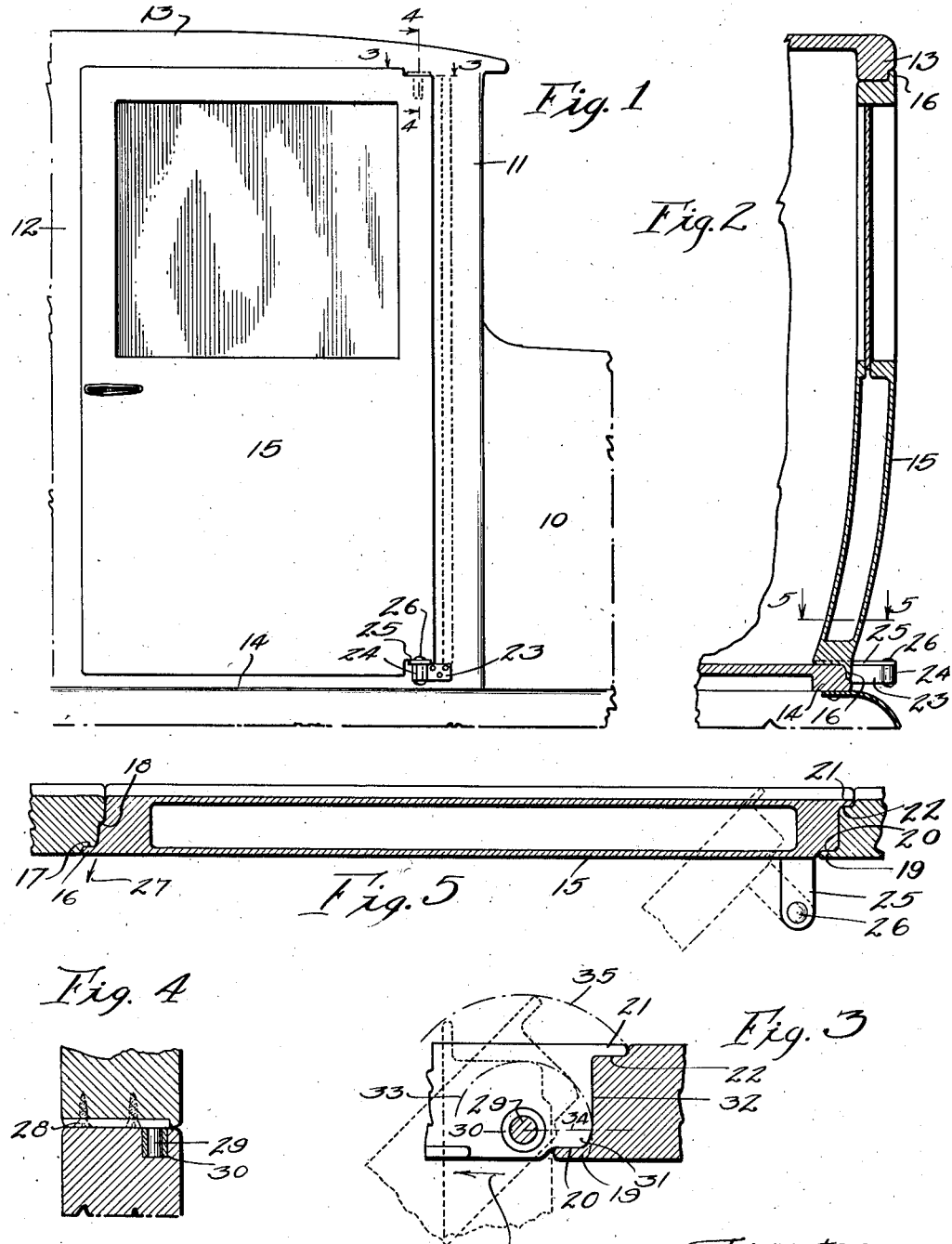

1,575,654

UNITED STATES PATENT OFFICE.

VINCENT SOUTHWORTH, OF LAURENS, IOWA.

VEHICLE DOOR CONSTRUCTION.

Application filed October 10, 1924. Serial No. 742,813.

*To all whom it may concern:*

Be it known that I, VINCENT SOUTH-WORTH, a citizen of the United States, and a resident of Laurens, in the county of Pocahontas and State of Iowa, have invented certain new and useful Improvements in Vehicle Door Construction, of which the following is a specification.

My invention relates to a vehicle door construction, and it is my object to provide such a device which is of simple, durable and inexpensive construction.

A further object is to provide a door construction especially adapted to exclude air currents when the car is in rapid motion.

More specifically, my invention is embodied in a construction in which the apertures between the door and the door frame are closed by flanges extending rearwardly of the car, the flange at the forward edge of the door being formed on the body and overlapping the door.

A further object of the invention is to provide means for hinging the door so that the forward edge of the door may move to snug position behind the body flange overlapping it without interference between the edge of the door and the flange.

More specifically, the latter object includes the pivoting of the door on an axis so related to the door frame that the outer forward corner of the door, registering with the door frame at the base of the flange on its interior side, will move inwardly and rearwardly so as to clear the flange and the adjacent edge of the door opening.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Fig. 1 is an elevation of a portion of a vehicle with my improved door construction embodied therein.

Fig. 2 is a central, vertical, transverse, sectional view through the door and contiguous frame of the vehicle.

Fig. 3 is a detail sectional view through a portion of the door frame illustrating the adjacent upper edge of the door in plan in closed position, taken on the line 3—3 of Fig. 1.

Fig. 4 is a detail, vertical, sectional view, taken on the line 4—4 of Fig. 1.

Fig. 5 is a transverse, sectional view through the door near the lower edge thereof, taken on the line 5—5 of Fig. 2.

With the increased use of closed cars there has been an increased demand for the nicer details of finish which add to comfort. Closed cars are almost universally supplied with some means of heating, and it is demanded that the car be kept heated to a very even temperature. On long drives where the car is brought to considerable speed, it is found that air currents will be created sufficient to carry away a large amount of heat supplied to the interior of a car. A large percentage of such air currents are admitted to the car around the edges of the door, especially the forward edge.

In the ordinary construction a flange is provided on the door which overlaps the edge of the door frame on all sides and is effective in excluding air at the rear and lower edges of the door. At the forward edge, however, this flange serves to trap a portion of the air and guide it into the aperture between the forward edge of the door and the door frame so as to create a draft of cold air entering the car when the car is in rapid motion. I have found that the extent of these drafts is considerable when the car is traveling rapidly.

My invention contemplates providing a flange overlapping the aperture between the door and door frame and extending rearwardly so that the effect of the air rushing past the body will be exactly the opposite of that just described. With the use of such a flange, however, the problem of hinging the door so that it may be opened without interfering with flange presents itself.

In Fig. 1 I have indicated a portion of the body of a car generally by the reference character 10. The door frame comprises the forward and rear posts, 11 and 12, and the upper and lower sills, 13 and 14. The door, 15, has the outer flanges, 16, around the rear and upper and lower edges which are received in a depression, 17, in the members, 12, 13 and 14, respectively, in order that the door may be flush with the body of the car when closed. The rear edge of the door may be stepped, as at 18, in order that the flange, 17, need not bear the entire weight of the door when brought against the door frame. The forward edge of the door frame has the flange, 19, overlapping the door opening and the corresponding edge of the door has a depression, 20, to receive the flange, 19. The inner face of the door is preferably formed with a flange, 21, overlapping the door frame and received in a depression, 22, therein.

It will be seen that should the door be hinged in the ordinary manner the flange, 19, would extend into the path of movement of the forward edge of the door. Because of the curvature of the door at its lower portion, as illustrated in Fig. 2, the hinges cannot be placed at the juncture between the flange and the contiguous portion of the door. The lower hinge must therefore be extended as shown in Fig. 5 so as to be on the same vertical axis as the upper hinge. The lower hinge comprises the L-shaped member, 23, having at its outer end a loop, 24, and screwed or otherwise suitably secured to the car body at its inner end.

The coacting hinge portion comprises a plate, 25, fixed to the under side of the door, 15, and pivoted to the member, 23, by a pin, 26. Since the lower hinge is extended outwardly, as shown, the lower rear edge of the door in opening will tend to move slightly toward the door frame, as indicated by the arrow, 27. In order to prevent binding of the door in the frame, the contiguous edges of the door and frame may be cut slightly on a bevel, as shown. It is desirable, however, that the incline at this point be as small as possible, and therefore the hinge axis should be as close to the plane of the door as is possible with respect to the upper hinge.

Referring now to the upper hinge, any suitable construction may be used in order to bring the axis to the proper position. In Fig. 4 I have shown a plate, 28, fixed to the door frame and having a downwardly-projecting pin, 29. A socket may be formed in the upper edge of the door by means of a bushing, 20, sunk therein adapted to receive the pin, 29. For the reason stated above it is desirable to have the pin, 29, located as far inwardly as possible. At the same time the outer corner of the door, indicated at 31, would tend to bind against the door frame in the opening of the door if the said corner were to protrude beyond the radius of a cylinder concentric with the pin, 29, and tangent to the edge, 32, of the door frame. This limit is indicated by the broken line, 33.

For the above reason the corner, 31, may be slightly rounded off within the arc, 33. To reduce the necessity of rounding the corner to a minimum, the pin, 29, is located in a plane, 34, normal to the edge, 32, which is as close to the outer surface of the door in the upper portion thereof as practical. It will be seen that as the door is swung open the corner, 31, will follow the course indicated by the arc, 33, and the flange, 21, will move as indicated by the arc, 35, through the various positions shown in dotted lines. The lower portion of the door will move directly away from the contiguous door frame, as indicated by the dotted lines in Fig. 5.

The advantages of providing the rearwardly-extending flange are obvious. As the car moves forward the air current will move past the surface of the door as indicated by the arrow, 36, and as a result, if there is an aperture between the door and door frame, the heated air from within will tend to be drawn therethrough to the outside of the car by the effect of the air current. This effect is not sufficient to remove any appreciable quantity of heated air from the car, but is effective in preventing cold air entering the car.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In a vehicle door construction, a vehicle body including a door frame, an outer rearwardly extending flange forming a continuation of the outer surface of the door frame at its forward side, a door hinged to the frame near its forward edge in such manner as to have its forward edge concealed by the flange when it is in closed position, and a flange on the upper, lower and rear edges of the door adapted to overlap the door frame when the door is closed, the flanges on the upper and lower edges terminating short of the hinge axis.

2. In a vehicle door construction, a vehicle body including a door frame having a forward post, a door hinged to the frame on an axis positioned intermediate of its length and near the plane of the outer surface of the door, the forward edge of the door being of substantial width and designed to fit snugly against said door post when the door is closed, and an outer, rearwardly extending flange on the door post, flush with the outer surface of the vehicle, and adapted to overlap the forward edge of the door when in closed position.

3. In a vehicle door construction, a vehicle body including a door frame having a forward post, a door hinged to the frame on an axis intermediate of its length, the forward edge of the door being of substantial width, adapted to fit snugly against the said post when the door is closed, and being cut away at its outer corner within an arc described about the axis of the door on a radius equal to the distance between said axis and the door post, on a line normal to the face thereof, and an outer rearwardly extending flange on the door post adapted to overlap the forward edge of the door when in closed position.

VINCENT SOUTHWORTH.